April 15, 1958     H. WESTERKAMP     2,830,649
CONNECTING THE ENDS OF SOUND RECORD THERMOPLASTIC STRIPS
Filed July 9, 1954

Hugo Westerkamp
Inventor:

by Mason Parker Miller & Stewart
Attorneys.

United States Patent Office 2,830,649
Patented Apr. 15, 1958

2,830,649

CONNECTING THE ENDS OF SOUND RECORD THERMOPLASTIC STRIPS

Hugo Westerkamp, Koln-Poll, Germany, assignor to Tefi-Apparatebau Dr. Daniel K. G., Porz, Germany Application July 9, 1954, Serial No. 442,374

6 Claims. (Cl. 154—42)

German patent specification No. 749,671 describes an arrangement for connecting the ends of endless sound record strips made of plastic synthetic material and provided with sound record for a mechanical pick-up, which arrangement consists of a press cooperating with a cooling device and having a table formed by two contact rails for high current intensities with an insulating plate arranged between them, the press ram being arranged above the insulating plate so that it engages the contact rails on both sides.

The arrangement is operated in the following manner: On the table formed by the two contact rails with an insulating plate between them a so-called cover matrix is placed, that is a metal strip or band made of a poor current conducting material one surface of which is provided with ribs which correspond to the sound tracks or grooves in the ends of the sound record strip to be connected at the point of connection. The sound tracks of the ends of the sound record strip to be connected are placed over the ribs of the cover matrix, whereupon the press ram is lowered and at the same time current is supplied to the contact rails. While current is flowing through these contact rails and the cover matrix, that is, while the parts of the device are being heated by the current passing therethrough, a cooling medium is fed to the contact rails. Consequently the cover matrix is heated by the current so strongly over the middle of the insulating plate that the heat which it radiates softens the overlapping strip ends and these can be welded together by the press ram, at the same time impressing the cover matrix, whereas from the welding point towards the contact rails a very sharp drop in temperature takes place which prevents the ends of the strip still under the press ram from softening.

In practice different welding results are obtained when using this arrangement, which, as thorough examination has shown, are due to the fact that the cover matrices which must be exchanged in the case of different kinds of sound record strips, are not always sufficiently firmly secured and do not bear with their entire end surfaces on the contact rails for high current intensities. This is partly because the cover matrices shrink or become distorted and partly because the dirct collects on the bearing surfaces of the cover matrices or layers of grease form thereon which have partly an electrical and partly a heat insulating effect.

In order to overcome these objections the insulating plate of the welding press is, according to the invention, bridged by a conductor member serving as support for a cover matrix for the ends of the strip and rigidly connected with the two contact rails for high current intensities, this conductor member having such a small cross-sectional area that it is strongly heated by the current.

An embodiment of the invention is illustrated by way of example in the accompanying drawing, in which.

Figure 1:
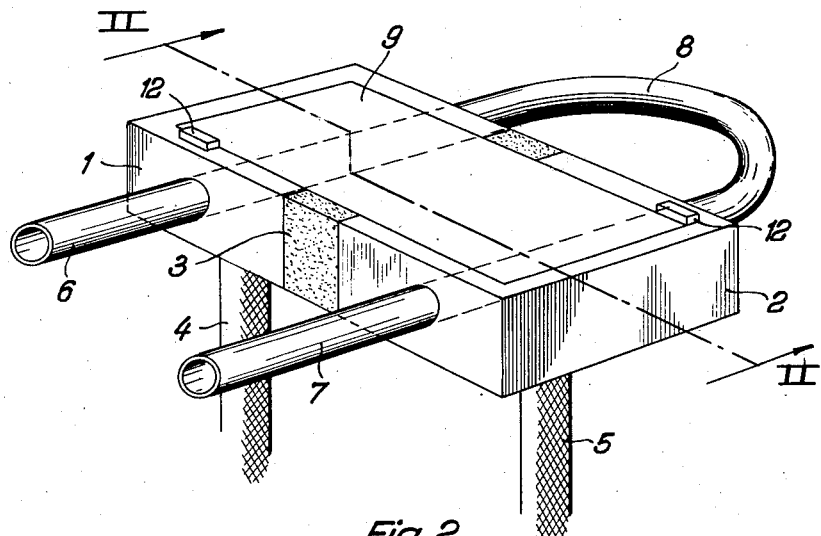
Fig. 1 shows the arrangement in perspective view.
Figure 2:
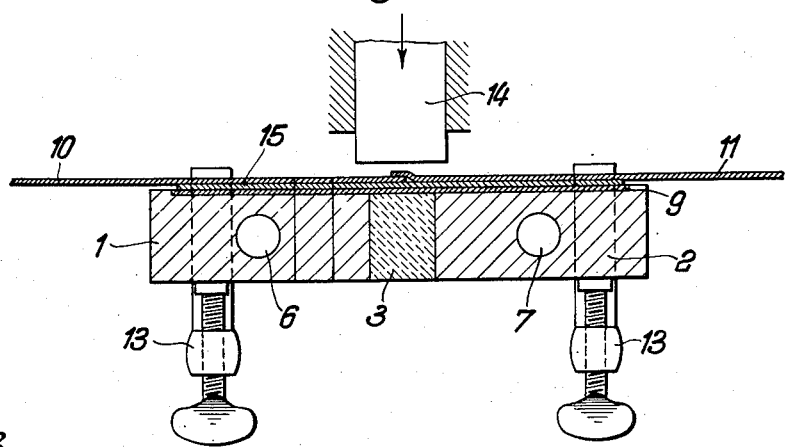
Fig. 2 is a vertical longitudinal section on the zig-zag line II—II of Fig. 1 with the matrix plate and film ends in place and Fig. 3 is an enlarged fragmentary vertical view of a portion of Fig. 2.
Figure 3:
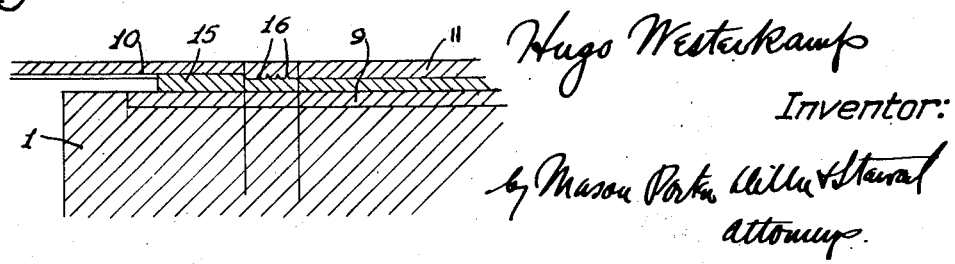

The press table consists of two blocks 1 and 2 of a good electrically conducting material, such as copper, and of relatively large cross-sectional area, and between these two blocks there is a block 3 of insulating material. The blocks 1 and 2 are connected to a current transformer by means of contact rails 4 and 5 and supplied with about 1,000 amperes. Passages 6 and 7 are provided in the blocks 1 and 2 and connected by a pipe 8. Cooling medium is circulated through these passages.

A thin conductor member 9 absolutely flat on both sides, is recessed in the press table and rigidly connected at its two ends to the blocks 1 and 2. The conductor member 9 preferably consists of a poor electrical conducting metal, such as iron. The cover matrix 15 is laid loosely on the conductor member 9 with its ribs 16 directed upwards and the ends 10, 11 of the sound record strip to be joined are engaged with the sound tracks directed downwards in the grooves of the cover matrix which is preferably secured against shifting by abutments 12.

The ends of the strip are cut to length so that they overlap in the manner illustrated. Instead of the strip ends overlapping as shown, they may overlap in some other manner, for example they may be beveled or biased. Whereas the sound track of the portions of the strip ends bearing against the end portions of the cover matrix must be accurately aligned, the ribs in the middle zone of the cover matrix must first be embossed in the ends of the sound record strip as they melt. Clamping devices 13 hold the ends of the strip in engagement with the cover matrix and hold this and the ends of the strip firmly on the press table. The ram 14 only serves for exerting the pressure necessary for pressing the strip ends together. The press ram extends laterally up to the blocks 1 and 2. When the current is switched on, it flows unimpeded through the conductor member 9 owing to its being rigidly connected to the blocks 1 and 2. As the blocks 1 and 2 have a relatively large cross-sectional area and are made of a good conducting material, these blocks are not heated by the passage of the current, whereas the middle portion of the conductor member 9 between the blocks 1 and 2 is heated, for example, to about 120 to 180° C., when using sound record strips made of polyvinyl chloride, mixed polymers, cellulose acetates and the like. This heating is transmitted under the pressure of the press ram 14 to the cover matrix 15 which in turn imparts it to the ends of the strip which thus become so plastic that the sound ribs of the middle portion of the cover matrix 15 are impressed therein.

To prevent the sound record strips from becoming damaged by the pressing operation, the cool zone of the blocks 1 and 2 extends into the pressure zone of the press ram 14, whereby again the rigid connection of the ends of the conductor member 9 with the blocks 1 and 2 results in good conduction of heat. The temperature in the cool zone is maintained below the softening point of the thermoplastic strip material, that is below 50° C. in the case of the materials mentioned above. The lateral edges of the press ram 14 therefore always press on the unsoftened portions of the strip so that no damage is caused to the strip and to the sound record thereon.

It is evident that the invention is not restricted to the example described and illustrated. Numerous modifications in the design of the arrangement can be carried out without departing from the scope of the invention. Thus, for example, the conductor member 9 need not be let into the blocks 1 and 2 and into the insulating plate or block 3, a conductor member might be used which extends across the entire table, that is rests on the table formed by the blocks 1 and 2 and the insulating plate or block 3.

I claim:

1. In combination, a press table formed of two blocks of material of good electric conductivity separated by a block of insulating material, a thin conducting member permanently bridging the top of the table over the several blocks, a cover matrix on the conducting member and a press ram operable vertically over the block of insulating material.

2. In combination, a press table formed of two blocks of material of good electric conductivity separated by a block of insulating material, a thin conducting member permanently recessed in the top of the table over the several blocks, a cover matrix on the conducting member, a press ram operable over the block of insulating material, and cooling means for the two first-named blocks.

3. In combination, a press table formed of two blocks of material of good electric conductivity separated by a block of insulating material, a thin conducting member permanently bridging the top of the table over the several blocks, a cover matrix on the conducting member, a press ram operable over the block of insulating material, and the adjacent edges of the two first named blocks, and cooling means for said blocks.

4. In combination, a press table formed of two blocks of material of good electric conductivity separated by a block of insulating material, a thin conducting member permanently recessed in the top of the table over the several blocks, abutments in the conducting blocks at diagonal corners of the conducting member, a cover matrix on the conducting member between said abutments and a press ram operable vertically over the block of insulating material.

5. In combination, a press table formed of two blocks of material of good electric conductivity separated by a block of insulating material, a thin conducting member permanently recessed in the top of the table over the several blocks, a cover matrix on the conducting member, clamping means for holding the meeting edges of a work strip over the matrix above the insulating block and a press ram operable vertically over said meeting edges.

6. In combination, a press table formed of two blocks of material of good electric conductivity separated by a block of insulating material, a thin conducting member permanently recessed in the top of the table over the several blocks, a cover matrix having a ribbed surface corresponding to the sound tracks of a record strip, said matrix being positioned on the thin conducting member with the ribbed surface, uppermost, clamping means for holding a record strip on the matrix with the sound tracks in registry with said ribbed surface of the latter and the ends of the strip in contact over the insulating block, and a press ram operable vertically over the meeting edges of the strip above the insulating block.

References Cited in the file of this patent

UNITED STATES PATENTS

| | | |
|---|---|---|
| 2,468,629 | Herzig et al. | Apr. 26, 1949 |
| 2,480,794 | Waggoner | Aug. 30, 1949 |
| 2,577,570 | Eisenberg | Dec. 4, 1951 |
| 2,633,443 | Langer | Mar. 31, 1953 |
| 2,640,798 | Langer | June 2, 1953 |
| 2,743,763 | Westerkamp | May 1, 1956 |